United States Patent [19]
Fosseen

[11] 4,086,728
[45] May 2, 1978

[54] HANDLE FOR A TRACTOR CAB DOOR

[76] Inventor: Dwayne L. Fosseen, R.R. #2, Radcliffe, Iowa 50230

[21] Appl. No.: 770,399

[22] Filed: Feb. 22, 1977

[51] Int. Cl.² .............................................. E05B 1/00
[52] U.S. Cl. .................................. 49/460; 16/111 R
[58] Field of Search ............... 49/460; 16/1 R, 110 R, 16/111 R; 296/146, 152

[56] References Cited
U.S. PATENT DOCUMENTS

| | | | |
|---|---|---|---|
| 1,194,237 | 8/1916 | Roberson | 49/460 X |
| 1,671,595 | 5/1928 | Lambert | 49/460 X |
| 2,870,493 | 1/1959 | Beyrle | 49/460 |
| 3,967,850 | 7/1976 | Whisler | 49/460 X |

Primary Examiner—Philip C. Kannan
Attorney, Agent, or Firm—Henderson, Strom & Sturm

[57] ABSTRACT

A handle of a specific novel configuration is attached to the door of a tractor cab having a specified configuration.

1 Claim, 6 Drawing Figures

HANDLE FOR A TRACTOR CAB DOOR

BACKGROUND OF THE INVENTION

In recent years, more and more agricultural tractors have been manufactured with cabs thereon for shielding the tractor operator from inclement weather. One of the major problems in this area of technology has been the one of safety in operation of the cab doors. On the one hand, there is a need for latches, handles and the like for opening and closing a door, which are easily operable, but which do not pose a safety hazard.

One problem with certain commercial door structures is that there is not sufficient structure provided to allow the operator to easily open or close the door, or to support himself while entering or exiting the cab. Inadequate support structure can accordingly, contribute to accidents of a type whereby the operator slips and falls onto or into something on or attached to the tractor.

A problem with certain cab structures which provide adequate structures for controlling the opening and closing of the door and a way for the operator to support himself when entering and exiting the cab is that these structures usually pose a hazard if the tractor should roll over or experience a similar motion. In such a case, these control handles, because of the way they project into the cab, can badly injure the tractor operator if he is thrown against these structures during such an accident.

Consequently, there is a need for door and handle structures which facilitate easy control of a door, even on windy days, facilitate entering and exiting the cab without an inordenant danger of slipping, and yet which do not pose safety hazards if a tractor operator is thrown from his tractor seat while operating the tractor.

SUMMARY OF THE INVENTION

A handle having specific configuration is attached to a door of a type used on cabs of agricultural tractors. The door includes a lower sheet member, an upper transparent window member and a structure connecting the sheet member and window member for sealing out wind and precipitation. The sealing structure includes a pair of planar surfaces disposed at angles with respect to each other. The handle is oriented generally parallel to these planar surfaces and is attached thereto. Because of the configuration of the combination of the handle and the door, a safe and convenient structure is provided for facilitating control of the door, even on windy days.

An object of the present invention is to provide an improved handle for the door of a tractor cab.

Another object of the invention is to provide a handle for a door which facilitates easy control of the door.

A further object of the invention is to provide a combination door and handle for a tractor cab which is safe and convenient to use.

Still a further object of the invention is to provide a handle which is easy to grasp, but yet which does not restrict visibility or have projections which would tend to injure a tractor operator if the tractor overturned.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
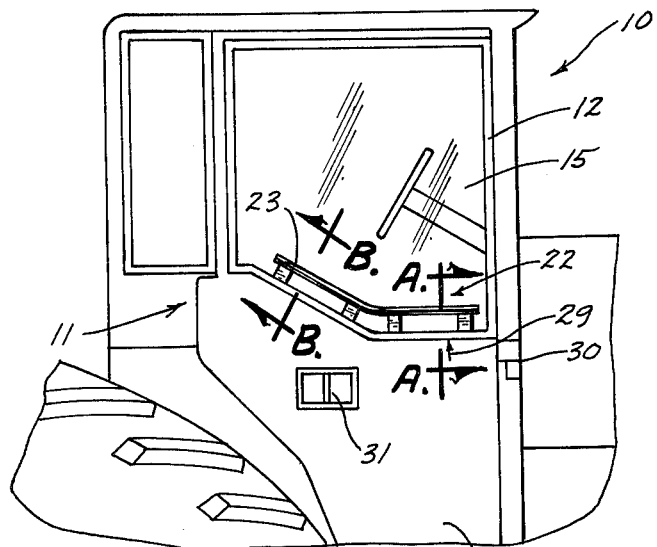
FIG. 1 is a side elevational view of a tractor cab attached to a tractor.

Referring now to the drawings wherein like reference numerals designate identical or corresponding parts throughout the several views, FIG. 1 shows a cab 10 attached to an agricultural tractor. The cab 10 has a door 11 attached thereto, the door 11 including a frame 12 for providing structural integrity to the door.

A pair of sheet members 13 and 14, constructed of thin sheets of steel, are attached to a portion (not shown) of the frame 12 which is disposed between the sheet members 13 and 14. The configuration of the frame 12 within the sheet members 13 and 14 is not particularly critical and can be of any configuration which will provide the needed structural stability for supporting the sheet members 13 and 14.

A window member 15, preferably formed of safety glass, is disposed within the top portion of the frame 12 and above the sheet members 13 and 14. A sealing structure 16 is provided for sealing the window member 15 with respect to the sheet members 13 or 14. The sealing structure 16 includes top sheet member 17 which is rigidly affixed to the sheet member 14 and top sheet member 18 which is rigidly affixed to the sheet member 13. A sealing structure 19, such as a strip of rubberized material, is disposed on each side of the window member 15 for completing the sealing function. It is also noted that a part of the frame 12 can extend below this sealing structure 16 for better support of the sealing structure 16.

One important aspect of this invention relates to the sheet member 17, which includes a first horizontally disposed planar surface 20 and a second planar surface 21, which surface 21 is neither vertical or horizontal, but which meets with the horizontal disposed surface 20.

Figure 3:
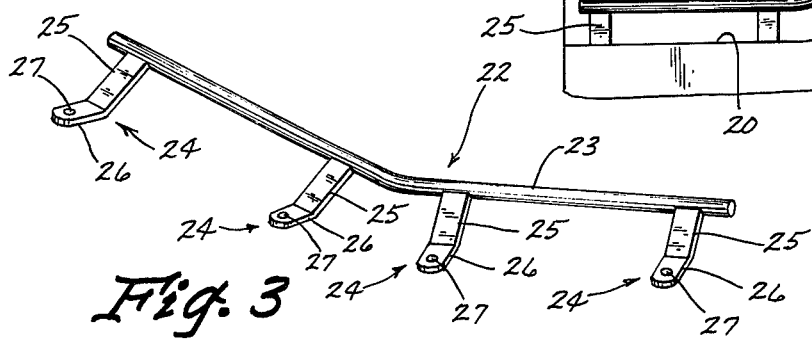
FIG. 3 is a perspective view of the handle of the present invention.
Figure 4:
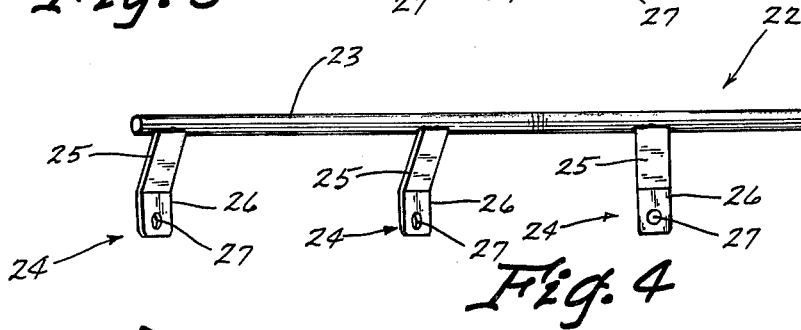
FIG. 4 is a top view of the handle shown in FIG. 3.
Figure 5:
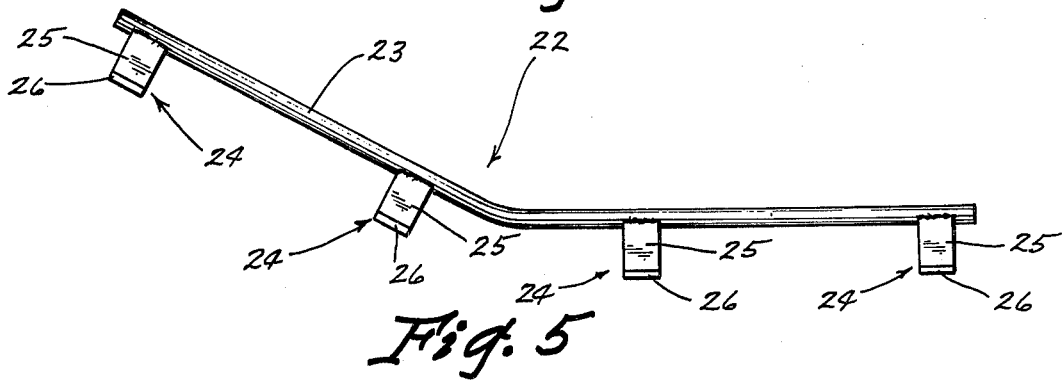
FIG. 5 is a side view of the handle shown in FIGS. 3 and 4.

A handle 22, as can be seen in detail in FIGS. 3-5, is attached to the sheet member 17 of the sealing mechanism 16 on the inside of the door 11. The handle 22 includes a bar 23 having two straight portions thereof disposed at an angle with respect to each other. The handle 22 includes a plurality of attaching members 24. Each of these attaching members 24 includes a flat portion 25 which is rigidly attached at one end of the bar 23, and a second flat portion 26 which is rigidly attached to one end to the flat section 25 of the attaching member 24. An opening 27 is disposed in each of the flat sections 26 of each of the attaching members 24. The attaching members 24 are preferably secured to the bar 23 by welding.

Figure 2:
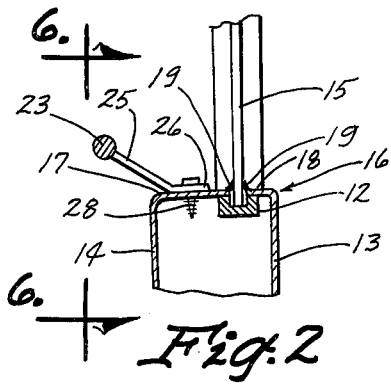
FIG. 2 is a partial cross sectional view taken along lines A—A or B—B of FIG. 1.
Figure 6:
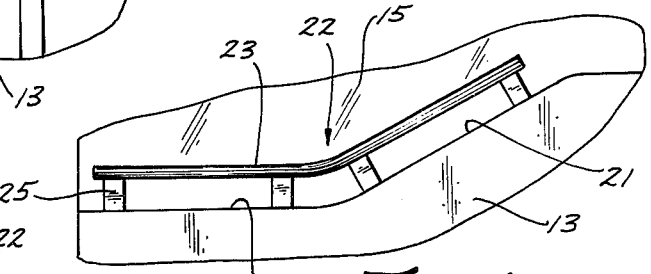
FIG. 6 is a view of the handle attached to the door from inside of the cab and along line 6—6 in FIG. 2.

Referring now to FIGS. 1, 2 and 6 it is noted that the handle 22 is attached to the inside of the door, and specifically to the sheet member 17 of the sealing structure 16. The flat portions 26 of the attaching members 24 fit flush onto the planar surfaces 20 and 21 so that metal screws 28 or other suitable fasteners can extend through the openings 27 and into holding contact with the sheet member 17.

It is noted that the handle 22 is of a particular configuration with respect to the door, in that the bar 23 is positioned above and inwardly with respect to the dividing line between the window member 15 and the sheet members 13 and 14 along the sealing structure 16. Consequently, this handle 22 does not restrict visibility, but yet provides a handle which is versatile and is in a position to provide extremely good control for opening and closing the door 11, while also allowing the tractor operator to use this handle 22 to support himself when entering or exiting the tractor cab 10. The fact that the handle 22 is higher at the rear portion thereof provides better control and access than a handle which merely extends horizontally. Additionally, should the tractor roll over or experience any unusual motion, the handle 22 does not pose any extraordinary dangers since it extends practically across the door 11 and has no extraordinary protrusions which could injure the tractor operator if he were to be thrown into them.

At least one manufacturer of tractors and tractor cabs has placed a handle on the inside of a door such as door 11 in a position approximately at the arrow 29, corresponding to a depression (not shown) in a member such as sheet member 17 of the door of the present invention. This illustrates that those engineers skilled in this art have attempted to provide handles on doors of these cabs which are safe, but that such attempts to safety directed toward prevention of roll over accidents tend to contribute to other types of accidents such as when the tractor operator has nothing to hold on to when entering and exiting the cab; and, furthrmore, such prior art handles do not facilitate good control of the door, especially on windy days when a great deal of leverage is desirable to aid in the ease of opening and closing a tractor cab door.

Accordingly, it can be easily appreciated that the preferred embodiment of this invention shown does indeed accomplish the objects set forth above. Obviously many modifications and variations of the present invention are possible in light of the above teachings. It is therefore to be understood that, within the scope of the appended claims, the invention may be practiced otherwise than as specifically described.

I claim:

1. A handle in combination with a door for a tractor cab, said door comprising:

a frame having a lower and an upper portion;

a sheet member attached to the lower portion of said frame for preventing wind and moisture from passing through said door, said sheet member including an upper section;

a transparent window member attached to the upper portion of said frame for shielding out wind and moisture, said window section including a lower section; and means for sealing the upper section of the sheet member to the lower section of the window member, said sealing means including a front section and a rear section, said front section including a substantially horizontally disposed surface, said rear section of said sealing means including a substantially planar surface disposed at an angle with respect to the horizontal surface of the front section, one end of the surface of the front section being connected to one end of the surface of the rear section;

said handle comprising:

a bar disposed substantially parallel to said sealing means, said bar being circular in cross sectional shape, a first portion of said bar being parallel to said horizontally disposed surface and a second portion of said bar being parallel to the planar surface of the rear section, said bar being disposed upwardly from and spaced from said sealing means; and means for attaching said bar to said door, said attaching means comprising a first member rigidly attached to said bar at one end thereof, the other end of said first member including a flat surface, said flat surface being disposed in juxtaposition to said horizontally disposed surface, a hole being disposed in said other end of the first member and a threaded member extending through said hole and through said horizontally disposed surface; and, a second member rigidly attached to said bar at one end thereof, the other end of said second member including a flat surface which is disposed in juxtaposition to said planar surface of the rear section, a hole being disposed in the other end of the second member and a threaded member extending through the hole in the second member and through said planar surface of the rear section of the sealing means.

* * * * *